Dec. 19, 1922. 1,439,614.
F. DE BORGGRAVE.
VEHICLE CHASSIS.
FILED NOV. 14, 1921. 2 SHEETS—SHEET 1.
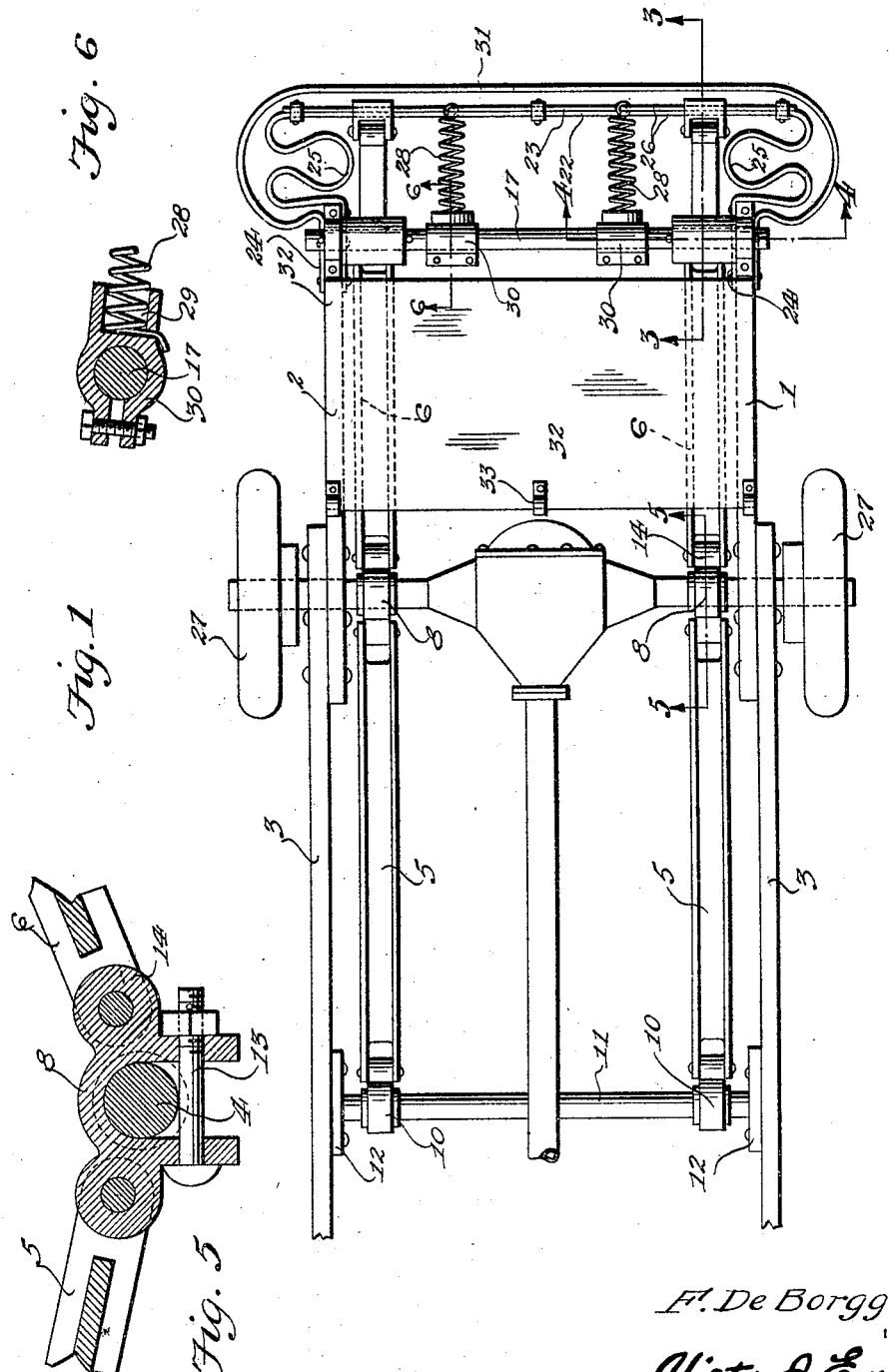
F. De Borggrave
INVENTOR
BY Victor J. Evans
ATTORNEY

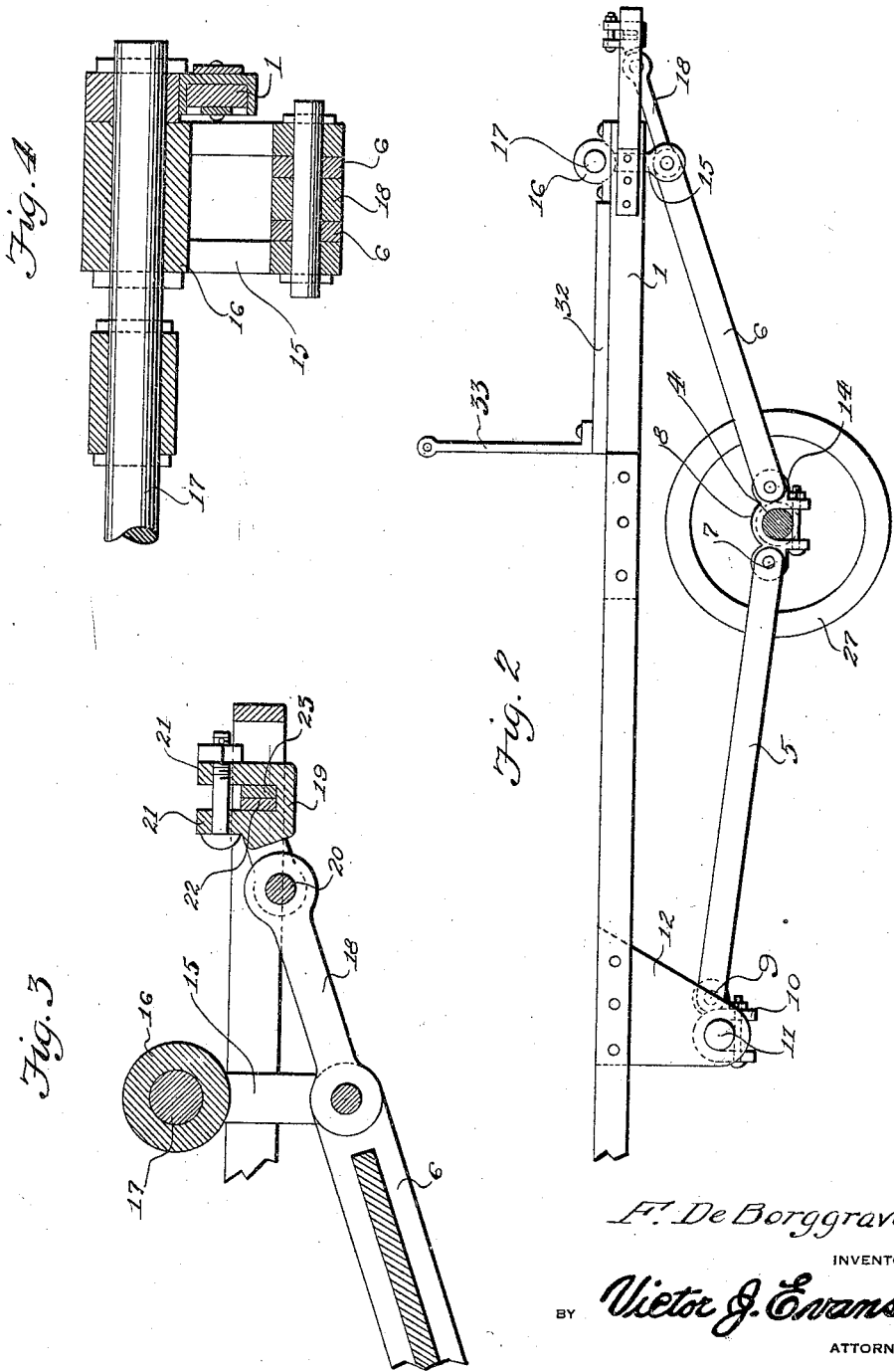

Patented Dec. 19, 1922.

1,439,614

UNITED STATES PATENT OFFICE.

FELIX DE BORGGRAVE, OF CHICAGO, ILLINOIS.

VEHICLE CHASSIS.

Application filed November 14, 1921. Serial No. 515,049.

*To all whom it may concern:*

Be it known that I, FELIX DE BORGGRAVE, a citizen of the United States, residing at Chicago, in the county of Cook and State of Illinois, have invented new and useful Improvements in Vehicle Chassis, of which the following is a specification.

This invention relates to motor vehicles or automobiles and an object of the invention is to provide a vehicle chassis embodying a novel form of suspension and spring action for increasing the shock absorbing proclivities of the chassis, and consequently increase the ease and smoothness of riding of the vehicle.

Another object of this invention is to provide, in the vehicle chassis a novel form of spring bumper structure and suspension levers which carry the axles of the vehicle and are arranged whereby the shocks occasioned by the travel of the vehicle over rough surfaces or undulations in the roadway, to be transmitted to and absorbed by the buffer structures in a direction substantially parallel with the line of travel of the vehicle thereby preventing vertical vibration of the vehicle body and relieving the persons or contents of the vehicle body of the jolts or shocks caused by the ordinary type of spring suspension of vehicles.

Another object of the invention is to provide a vehicle chassis which will impart the desirable easy riding features of long wheel base cars or vehicles to short wheel base vehicles permitting the ease of operation of a short wheel base vehicle and the easy riding features of a long wheel base.

Other objects of the invention will appear in the following detailed description taken in connection with the accompanying drawings wherein:

Fig. 1 is a fragmentary top plan of the vehicle chassis constructed in accordance with this invention.

Fig. 2 is a fragmentary side elevation of a vehicle chassis constructed in accordance with this invention.

Fig. 3 is a fragmentary section taken on the line 3—3 of Fig. 1.

Fig. 4 is a fragmentary cross section taken on the line 4—4 of Fig. 1.

Fig. 5 is a fragmentary section taken on the line 5—5 of Fig. 1.

Fig. 6 is a detail section view taken on the line 6—6 of Fig. 1.

In the drawings, my improved invention is illustrated as adaptable for attachment to vehicle chassis of existing types but it is to be understood that the invention may be embodied in the chassis during the construction thereof.

The drawings illustrate axle side bars 1 and 2 which are adapted in any suitable manner to the side rails 3 of the vehicle chassis but in originally constructing the chassis the bars 1 and 2 will be eliminated and the rails 3 elongated to provide the necessary length.

The axles 4 of the chassis, only one of which is shown in the drawings are supported by a plurality of pivotally mounted rods 5 and 6. The rods 5 and 6 are disposed in pairs as clearly shown in Fig. 1 of the drawings, and the rods 5 are pivotally connected as shown at 7 to an axle engaging member 8 while their opposite ends are pivotally connected as shown at 9 to brackets 10. The brackets 10 are supported upon a cross rod 11 which is in turn suspended beneath the chassis by suitable brackets 12. The axle engaging members 8 are securely clamped on the axle 4 by suitable clamping means 13 and they have rearly extending ears 14 formed thereon to which rods 6 are connected. The rods 5 and 6 are preferably formed of I beams which increase their strength and the ends of the rods 6 remote from the axle 4 are connected to the depending arms 15. The depending arms 15 are carried by collars 16 which are rotatably mounted upon an auxiliary axle 17 supported by the bars 1 and 2. The depending arms 15 have forwardly extending horizontal extensions 18 formed thereon to which forked members 19 are connected as shown at 20. The arms 21 of the forked members 19 engage upon opposite sides of the spring bumper or buffer bars 22 and 23. The bars 22 and 23 are constructed of suitable spring steel and have their ends attached to the bars 1 and 2 as indicated at 24. The bars 22 and 23 are synchronously curved as at 25 intermediate their straight portions 26 and their points of attachment to the bars 1 and 2 to provide resilient shock absorbing springs for absorbing shocks incident with the travel of the wheels 27 over rough places in the roadway and prevent the transmission of the shock to the vehicle body carried by the chassis.

It will be noted that owing to the particular mounting of the rods 5 and 6, arms 15 and their connection with the springs 22 and 23 that the shocks will be delivered to the springs in a line substantially parallel with the line of travel of the vehicle preventing vibratory movement of the bed or body supported by the chassis and consequently greatly facilitating the smooth and easy riding of the vehicle. Spiral springs 28 are connected to the straight portions of the springs 22 and 23 and have their ends remote from the springs 22 and 23 seated in cups 29 carried by suitable attaching brackets 30 which are clamped upon the auxiliary axle 17. The springs 28 co-operate with the synchronously curved portions 25 in absorbing shocks.

A bumper or buffer spring 31 is provided the ends of which are attached to the bars 1 and 2 and the said bumper springs extend outwardly about the synchronously curved portions 25 and parallel to the straight portions 26 of the springs 22 and 23 in spaced relation thereto. The spring 31 serves the function of the usual bumper or buffer spring on a motor vehicle and also will co-operate with the springs 22 and 23 in absorbing shocks delivered to the wheels 27 when the springs 22 and 23 are forced into engagement with the spring 31.

When the device is attached to vehicles of existing construction the bars 1 and 2 may be utilized for supporting platforms 32 which in turn may serve as luggage carriers. Standards 33 are shown attached to the platforms 32 and these standards are provided for receiving straps or binders for binding luggage on the platforms 32. It is to be understood that the improved floating suspension of the axle and shock absorbing structures may be utilized upon the vehicle chassis in connection with the elliptical or semi-elliptical springs, without departing from the spirit of this invention.

It is, of course, to be understood that the invention may be constructed in other manners and the parts associated in other relations and, therefore, I do not desire to be limited in any other manner except as set forth in the claims hereunto appended.

Having thus described my invention what I claim is:

1. In a motor vehicle structure, the combination with a vehicle chassis, of a pair of spring buffer bars connected to the front end of the chassis and having parallel engaging straight portions extending across the front of the chassis, said bars bent to provide sinuous convolutions intermediate the straight abutting portions and their points of attachment to the chassis, an axle on the vehicle, links pivotally connected to said axle, and an articulated connection between said links and the abutting portions of said spring bars.

2. In a motor vehicle structure, the combination with a vehicle chassis, of a pair of spring buffer bars connected to the front end of the chassis and having parallel engaging straight portions extending across the front of the chassis, said bars bent to provide sinuous convolutions intermediate the straight abutting portions and their points of attachment to the chassis, an axle on the vehicle, links pivotally connected to said axle, an articulated connection between said links and the abutting portions of said spring bars, and a spring bumper attached to the chassis and extending about said spring bars across the front of the chassis in parallel spaced relation to the abutting portions with the spring bars.

3. In a motor vehicle structure, the combination with a vehicle chassis, of a pair of spring buffer bars connected to the front end of the chassis and having parallel engaging straight portions extending across the front of the chassis, one of said bars bent to provide sinuous convolutions intermediate the straight abutting portions and their points of attachment to the chassis, an axle on the vehicle, links pivotally connected to said axle, an articulated connection between said links and the abutting portions of said spring bars, a cross rod carried by the chassis rearwardly of said axle, and links pivotally connected to the axle and to said cross rods.

4. In a motor vehicle structure, a chassis, supporting axles therefor, a plurality of pivotally connecting rods connected to said axles, an auxiliary axle carried at each end of said chassis, collars rotatably carried by said auxiliary axles, certain of said rods being pivotally connected to said collars, shock absorbing springs at the ends of said chassis and mounted for tensioning movement longitudinally of the line of travel of the vehicle, and arms connecting said springs and collars whereby shocks administered to said axles will be absorbed by said springs, said springs comprising substantially straight bar springs having their ends attached to the chassis and provided with engaging straight portions, said springs being sinuously curved intermediate their straight portions and their attachment to the chassis.

5. In a motor vehicle structure, a chassis, supporting axles therefor, a plurality of pivotally connecting rods connected to said axles, an auxiliary axle carried at each end of said chassis, collars rotatably carried by said auxiliary axles, certain of said rods being pivotally connected to said collars, shock absorbing springs at the ends of said chassis and mounted for tensioning movement longitudinally of the line of travel of the vehicle, and arms connecting said springs and collars whereby shocks administered to said axles will be absorbed by said springs, said springs comprising substantially straight bar springs having their ends attached to the chassis and provided with engaging straight portions, said springs being sinuously curved intermediate their straight portions and their attachment to the chassis, spring receiving cups carried by said auxiliary axles, and spiral springs connected to said flat springs and extending into said cups.

In testimony whereof I affix my signature.

FELIX DE BORGGRAVE.